April 3, 1962  J. A. PALMBERG  3,028,026
POWER LOADING DEVICE

Filed Nov. 20, 1959  3 Sheets-Sheet 1

INVENTOR.
JOHN A. PALMBERG
BY
Gustave Miller
ATTORNEY

April 3, 1962 J. A. PALMBERG 3,028,026
POWER LOADING DEVICE
Filed Nov. 20, 1959 3 Sheets-Sheet 2

INVENTOR.
JOHN A. PALMBERG
BY
Gustave Miller
ATTORNEY

April 3, 1962 J. A. PALMBERG 3,028,026
POWER LOADING DEVICE
Filed Nov. 20, 1959 3 Sheets-Sheet 3

INVENTOR.
JOHN A. PALMBERG
BY
Gustave Miller
ATTORNEY

United States Patent Office 3,028,026
Patented Apr. 3, 1962

3,028,026
POWER LOADING DEVICE
John A. Palmberg, Palco, Kans.
Filed Nov. 20, 1959, Ser. No. 854,431
5 Claims. (Cl. 214—140)

This invention relates to a loading device, and it more particularly relates to power-operated, fluid-pressure controlled loading device.

The general type of power loaders heretofore used were not designed to operate with full mechanical efficiency because the load was always kept a relatively great distance from the tractor while the loading and unloading operation was taking place. This resulted in a large overbalance to the rear portion of the tractor which tended to lift this part of the tractor from the ground. Such lifting action decreased the traction of the rear wheels. It, furthermore, increased the weight or load on the front portion of the tractor and it quite difficult to steer the vehicle. In addition, in prior type loaders, the tractors generally had to be moved forward bodily while the load was being scooped up in order to obtain the necessary scooping force. This not only caused wear and tear on the tractor body and used up large amounts of fuel but also made for much difficult and tiring manipulation by the driver especially when hand-operated clutch means were used.

It is one object of the present invention to overcome the aforementioned difficulties by providing a loading device which has great mechanical efficiency because it is enabled to hold the load relatively close to the tractor during the operation thereof.

Another object of the present invention is to provide a loading device of the aforesaid type wherein the traction on the rear wheels and the ease of steering the front wheels of the tractor are maintained at all times.

Another object of the present invention is to provide a loading device of the aforesaid type where the loading and unloading operations can be effected while the tractor is standing still.

Other objects of the present invention are to provide an improved loading device of the character described that is easily and economically produced, which is sturdy in construction, and which is highly efficient in operation.

With the above and related objects in view, this invention consists in the details of construction and combination of parts, as will be more fully understood from the following description, when read in conjunction with the accompanying drawings in which.

Figure 3:
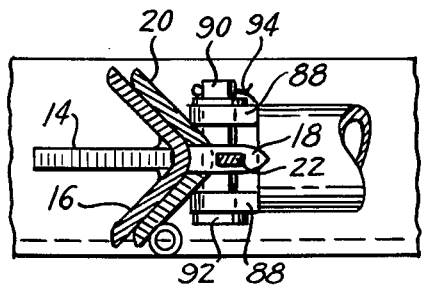
FIG. 3 is a fragmentary sectional view taken on line 3—3 of FIG. 1.

Referring in greater detail to the drawings wherein similar reference characters refer to similar parts, there is shown a loading device, generally designated 10, comprising a prime mover in the form of a tractor 12 provided with a pair of parallel, laterally spaced support standards 14, each having a V-shaped angle-bar section 16 at one edge (see FIG. 3). This angle-bar section 16 is provided with a pair of vertically-spaced tongues 18, each tongue 18 having a rectangular aperture therein.

Adapted to fit over the section 16 is a V-shaped angle-bar bracket 20 having a pair of apertures at the apex thereof. The apertures in the bracket 20 are adapted to be aligned with the tongues 18 of section 16 so that when the bracket 20 is in place on the section 16 (as in FIG. 3) the tongues 18 extend through their respective apertures in the bracket 20.

With the tongues 18 projecting through their respective apertures in the aforesaid manner, rectangular pins which taper inwardly from top to bottom in wedge-shaped fashion are inserted through the rectangular apertures in the tongues 18 to lock the bracket 20 in place.

At the upper portion of each bracket 20 is provided a shaft 24 (see FIG. 1) which supports a pivotal arm 26. The arms 26 combine to form a frame 28. The arms 26 are provided with offset ends 30 in which are formed bearings 32. These bearings 32 support a rotatable shaft 34 having a head 36 at one and a hole to receiving a cotter pin 38 at the other end.

A sleeve 40 (best shown in FIG. 2) surrounds the shaft 34 between the bearings 32 and depending from this sleeve 40 is a triangular brace member 42. At the apex portion of the brace 42 is provided a pivot pin 44 supporting a hanger 46 on a piston cylinder 48. A plunger or piston rod 50, having the ordinary piston head (not shown) within the cylinder 48, extends from the cylinder and inlet openings 52 and 54 (see FIG. 2) are provided adjacent opposite ends of the cylinder 48 and on opposite sides thereof.

The lower end of the piston rod 50 is provided with a socket 56 fitting between a pair of ears 58 on the rear surface of a scoop or bucket 60. A pin 62 extends through the socket 56 and mating apertures in the ears 58, this pin being held in position by a head 64 on one end and a cotter pin 66 extending through a hole on the other end.

The scoop or bucket 60 is supported by a pair of spaced, parallel links 68 which, at their upper ends, are pivotally held between ears 70 depending from arms 26 by means of pivot pins 72 having heads 74 at one end and cotter pins 76 extending through holes at the other end. At their lower ends, the links 68 are pivotally held between ears 78 on the bucket 60 by means of pivot pins 80 having heads 82 at one end and cotter pins 84 extending through holes on the other end.

Figure 2:
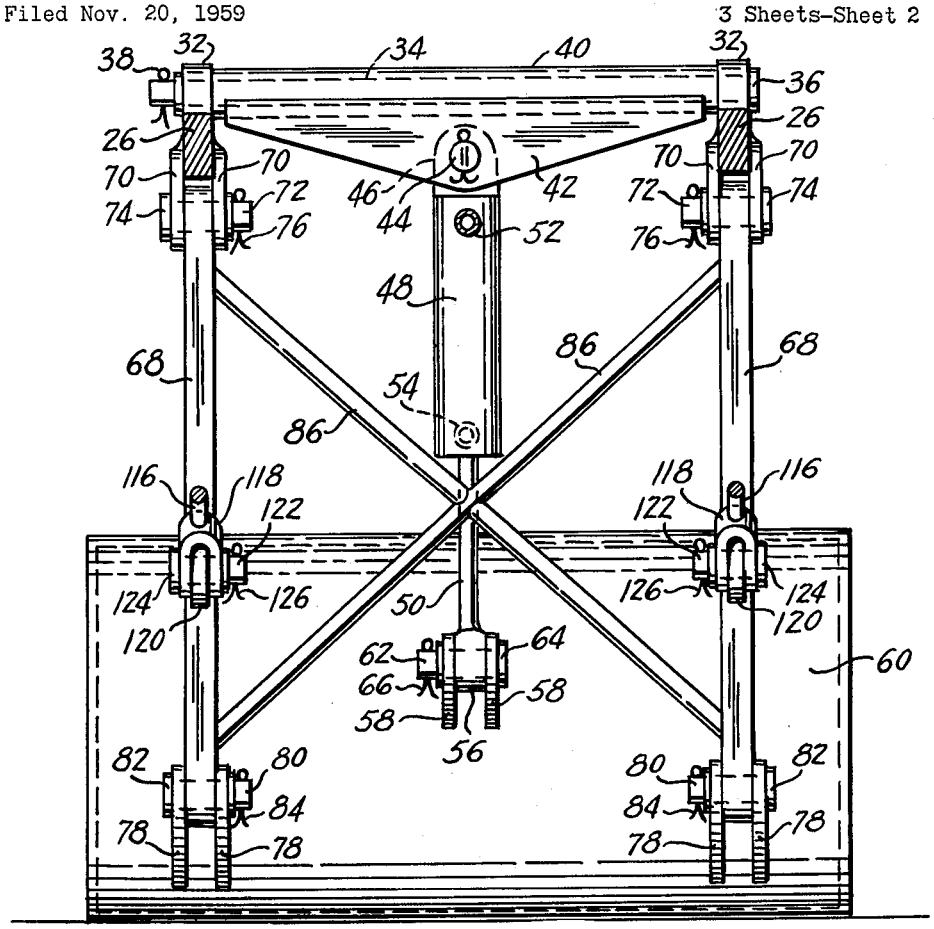
FIG. 2 is a sectional view taken on line 2—2 of FIG. 1.

The links 68 are connected to each other for parallel simultaneous movement by means of cross rods 86 (shown in FIG. 2).

Adjacent the bottom of each bracket 20 are provided ears 88 supporting a pivot pin 90. This pivot pin 90 is held in place by a head 92 at one end and a cotter pin 94 extending through a hole in the other end. The pin 90 pivotally supports a cylinder 96 having a piston rod 98 extending from the opposite end, the piston rod 98 being provided with the usual piston head (not shown) within the cylinder 96. The cylinders 96 are each provided with a pair of inlets 100 and 102 at opposite ends of the cylinder and disposed on opposite sides thereof.

The piston rod 98 extending from each cylinder 96 is provided with ears 104 pivotally embracing a hanger 106 depending from the respective arm 26 of frame 28. It is connected thereto by a pivot pin 108.

Also connected to each hanger 106, as by pivot pin 110, are ears 112 on one end of a cylinder 114. A piston rod 116 having a piston head (not shown) within the cylinder 114 extends from the cylinder 114 and is provided with ears 118 embracing a hanger 120 and pivotally connected thereto by a pin 122. The hangers 120 extend from the respective links 68 and the pins 122 are held in place by heads 124 and cotter pins 126 (see FIG. 2).

The tops of the brackets 20 support a bracket 128 to the end of which is releasably secured, as by screws 130, a valve housing or manifold 132. This valve housing 132 is provided with three separate valve chambers having separate manual valves 134, 136 and 138. Each valve chamber is connected to a source of fluid under pressure through a common line 140.

Each of the valves 134, 136 and 138 is connected respectively to the cylinders 96, 114 and 48 on each side of the frame, both cylinders 96 being controlled by valve 134, both cylinders 114 being controlled by valve 136 and both cylinders 48 being controlled by valve 138. The fluid connections between the oppositely disposed inlets on each cylinder and the respective valve chamber are indicated by lines 142 and 144 for cylinders 96, lines 146 and 148 for cylinders 114 and lines 150 and 152 for cylinders 48.

In operation, the valve 134 is moved to apply pressure fluid through lines 142 to the cylinders 96 and to open a return flow through lines 144. This moves piston rod 98 outwardly raising the arms 26 which lift up the bucket 60.

The tractor is then driven to the unloading point. Here, the valve 136 is moved to apply pressure through lines 146 and to open return flow through lines 148. This acts to move piston rod 116 outwardly which, in turn, causes links 68 to pivot upwardly carrying bucket 60 along therewith. The valve 138 is then moved to apply pressure fluid through lines 152 and return through lines 150. This moves piston rod 50 outwardly to tip the bucket 60 over (as shown in dotted outline in FIG. 1). In this position, the upwardly offset ends 30 of arms 26 prevent the bucket from tilting too far backwards.

With the above-described apparatus, the bucket 60 can be loaded while the tractor remains stationary. This is accomplished by driving the tractor forward to push the bucket into the load. Then the tractor is halted and while it is stationary, the links 68 are pivoted upward to cause the bucket to scoop up the load. The loading is completed by raising the arms 26 to raise the bucket. The tractor is then driven to the unloading point as described above.

Figure 4:
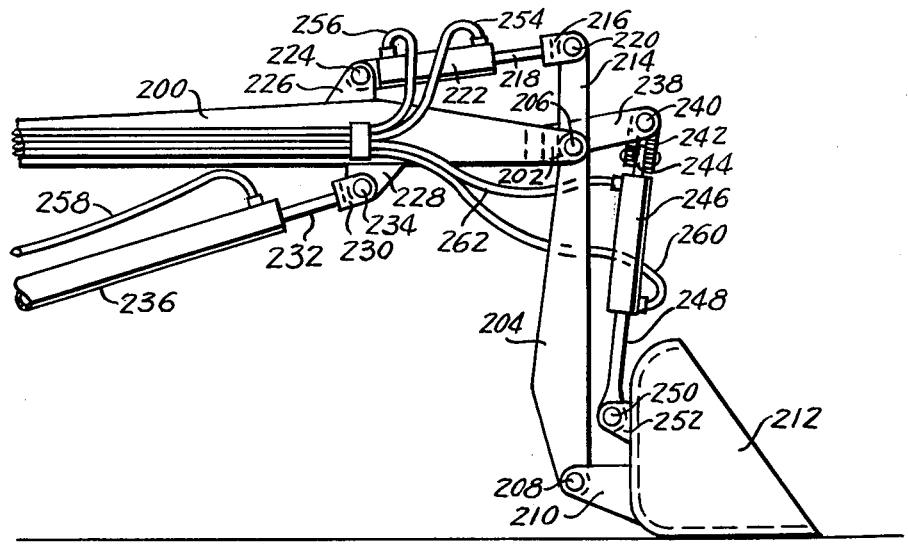
FIG. 4 is a fragmentary, side elevational view of a modified form of the invention.

In FIG. 4 there is shown a modified form of the device wherein the arms 200 are similar to arms 26 except that they do not have an upwardly offset end similar to ends 30. Instead, they are provided with ears 202 between which extend links 204 pivoted between the ears 202 by pins 206.

The lower ends of the links 204 are pivoted at 208 to brackets 210 extending from the rear of bucket 212. The upper ends of the links 204, indicated at 214, are pivoted between ears 216 at the end of a piston rod 218 by means of pins 220. The piston rod 218 has a piston head (not shown) within a cylinder 222 pivoted at 224 to ears 226 extending from the respective arms 200. The arms 200 are provided with hangers 228 to which ears 230, at the ends of piston rods 232, are pivotally connected by means of pivot pins 234. Each of the piston rods 232 is provided with a piston head (not shown) in the corresponding cylinder 236 which is similar to cylinders 96 and arranged on the tractor in the same manner.

Fixed to each arm 200 is an extension 238 and positioned between these extensions 238 is a shaft 240. On the shaft 240 is a sleeve similar to sleeve 40 and from this sleeve depends a brace member 242 to which is attached a hanger 244. The hanger 244 supports a cylinder 246 from which extends a piston rod 248 having a piston head (not shown) within the cylinder 246. The piston rod 248 is pivoted at 250 to a bracket 252 at the rear of the bucket 212.

Figure 1:
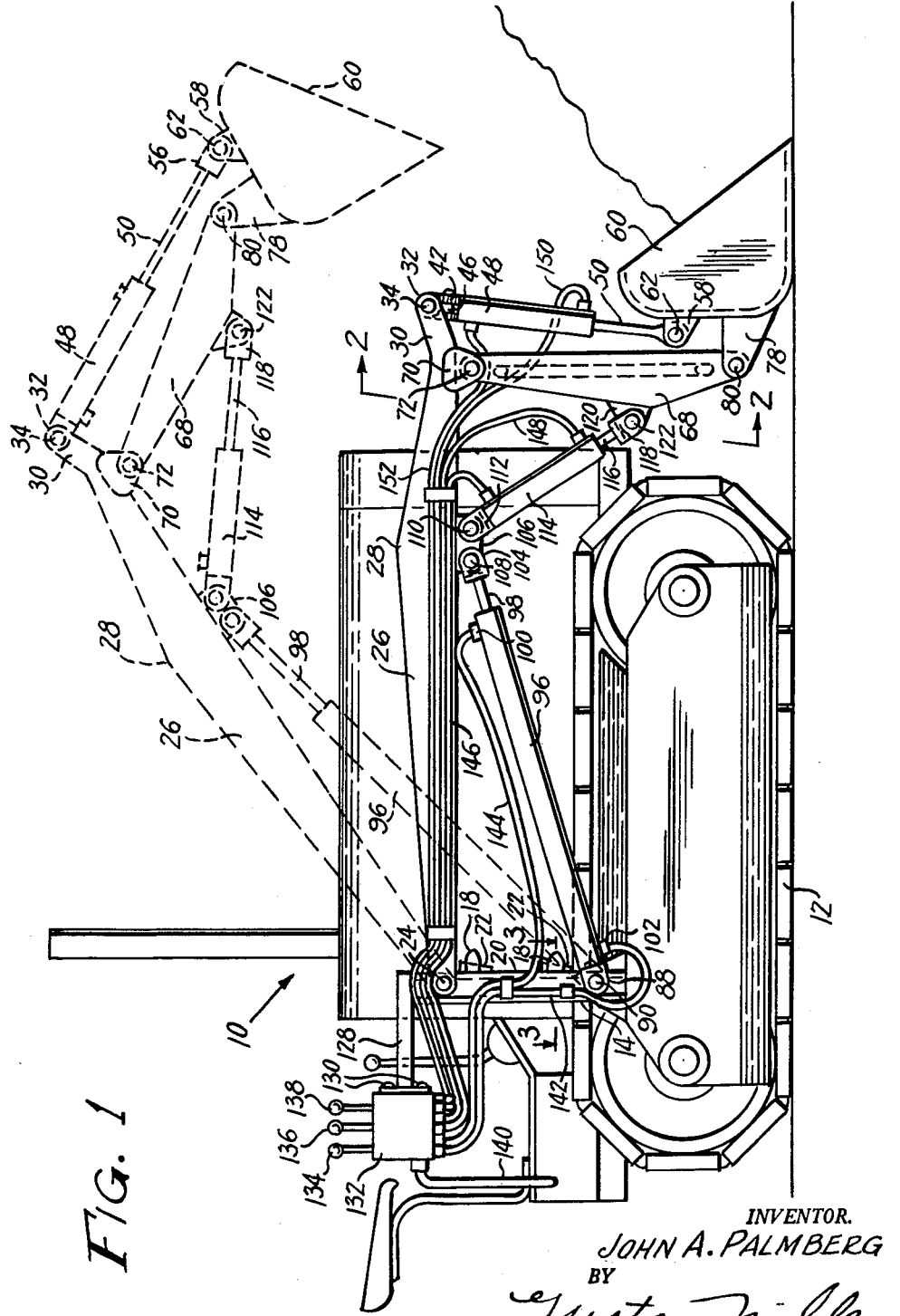
FIG. 1 is a side elevational view of a loading device embodying the present invention.

The various cylinders 222, 236 and 246 are in fluid connection with a valve housing such as shown at 132 in FIG. 1 through the same type lines from opposite ends of the cylinders in the same manner as in the device of FIG. 1. These lines are shown at 254 and 256 for cylinder 222, at 258 for cylinder 236 and at 260 and 262 for cylinder 246.

The device illustrated in FIG. 4 operates similarly to that shown in FIG. 1 but provides a somewhat greater degree of mechanical efficiency because the force of piston rods 218 are exerted at the end of the links 204 rather than at an intermediate point as in the device of FIG. 1. On the other hand, the device of FIG. 4 is somewhat bulkier and less compact than the device of FIG. 1 because of the overhead extension of the cylinders 222 and their associated parts.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A loading device comprising a prime mover having support means thereon, said support means comprising a pair of parallel laterally spaced vertically extending support standards, V-shaped in horizontal cross-section, a pair of vertically spaced tongues extending from the apex of each V-shaped standard, each tongue having an aperture therethrough, a separable bracket for each V-shaped standard complementary thereto and provided with spaced apertures in its apex to receive said apertured tongues therethrough, and removable wedge means through said apertures in said tongues securing said brackets assembled on said standards, a valve manifold mounted on said support brackets, a pair of arms arranged for simultaneous parallel movement, said arms being pivoted to said support brackets to form a frame and being pivotally connected to respective links, said links being connected for parallel simultaneous movement, said links being pivotally connected to a bucket, a fluid pressure cylinder pivoted at one end to said support means and having a piston therein provided with a piston rod extending out of the cylinder and pivotally connected to said frame, a second cylinder pivotally connected at one end to said frame and having a piston with a piston rod pivotally connected to said links, an offset extension connected to said frame and pivotally supporting a third cylinder, said third cylinder having a piston provided with a piston rod pivotally connected to said bucket, and each cylinder having a pair of fluid lines leading from opposite ends of the cylinder to a corresponding valve means in said valve manifold.

2. The loading device of claim 1 wherein said first and second cylinders are both individually pivotally connected to a common hanger on said frame and wherein the piston rod of said second cylinder is connected to an intermediate portion of said links.

3. The loading device of claim 1 wherein said first and second cylinders are pivotally connected to separate portions of said frame and wherein the piston rod of said second cylinder is connected to one end of said links.

4. The loading device of claim 1 wherein there are two sets of first and second cylinders with their corresponding piston rods, the piston rods of the first cylinders being connected to respective individual arms of said frame and the piston rods of the second cylinders being connected to respective individual links.

5. A loading device comprising a prime mover, a pair of pivotal arms on said prime mover, a bucket, and linkage pivotally connecting said arms to said bucket, fluid pressure means operatively connected to said arms and said linkage to selectively and individually pivot said arms and said linkage, fluid pressure means operatively connected to said bucket for selectively tilting said bucket relative to said arms and said linkage, each of said fluid pressure means comprising at least one cylinder having a piston therein and a piston rod extending from one end of the cylinder, each of said cylinders being in fluid connection from opposite ends thereof with a corresponding valve means, said prime mover being a tractor and said pivotal arms being mounted on a vertical support releasably secured to a support means on said tractor, said support means comprising a pair of parallel laterally spaced vertically extending support standards, V-shaped in horizontal cross-section, a pair of vertically spaced tongues extending from the apex of each V-shaped standard, each tongue having an aperture therethrough, said vertical support comprising a separable bracket for each V-shaped standard complementary thereto and provided with spaced apertures in its apex to receive said apertured tongues therethrough, and removable wedge means through said apertures in said tongues securing said brackets assembled on said standards.

References Cited in the file of this patent

UNITED STATES PATENTS 2,614,712     Dingley _____ Oct. 21, 1952

FOREIGN PATENTS 141,111     Sweden _____ June 30, 1953
539,100     Belgium _____ July 15, 1955